US012423888B2

(12) United States Patent
Tailang

(10) Patent No.: US 12,423,888 B2
(45) Date of Patent: Sep. 23, 2025

(54) VECTOR OBJECT GENERATION FROM RASTER OBJECTS USING SEMANTIC VECTORIZATION

(71) Applicant: Adobe Inc., San Jose, CA (US)

(72) Inventor: Nikhil Tailang, Noida (IN)

(73) Assignee: Adobe Inc., San Jose, CA (US)

( * ) Notice: Subject to any disclaimer, the term of this patent is extended or adjusted under 35 U.S.C. 154(b) by 967 days.

(21) Appl. No.: 17/527,331

(22) Filed: Nov. 16, 2021

(65) Prior Publication Data
US 2023/0154075 A1  May 18, 2023

(51) Int. Cl.
*G06T 11/20* (2006.01)
*G06F 3/04845* (2022.01)
*G06F 18/214* (2023.01)
*G06F 18/22* (2023.01)
*G06F 18/23* (2023.01)
*G06F 18/2431* (2023.01)
*G06T 7/10* (2017.01)
*G06V 30/19* (2022.01)
*G06V 30/262* (2022.01)

(52) U.S. Cl.
CPC ........ *G06T 11/203* (2013.01); *G06F 3/04845* (2013.01); *G06F 18/2148* (2023.01); *G06F 18/22* (2023.01); *G06F 18/23* (2023.01); *G06F 18/2431* (2023.01); *G06T 7/10* (2017.01); *G06V 30/274* (2022.01); *G06T 2200/24* (2013.01); *G06T 2207/20084* (2013.01); *G06T 2207/30196* (2013.01); *G06V 30/1908* (2022.01)

(58) Field of Classification Search
None
See application file for complete search history.

(56) References Cited

U.S. PATENT DOCUMENTS

| | | | |
|---|---|---|---|
| 6,674,905 B1* | 1/2004 | Matsugu | G06T 7/11 382/199 |
| 2005/0089216 A1* | 4/2005 | Schiller | G06V 10/56 382/165 |
| 2011/0148897 A1* | 6/2011 | Wong | G06T 11/001 382/199 |
| 2016/0267690 A1* | 9/2016 | Bai | G06T 11/001 |
| 2016/0274767 A1* | 9/2016 | Gupta | G06T 11/203 |

(Continued)

OTHER PUBLICATIONS

Liang, Xiaodan et al., "Human Parsing With Contextualized Convolutional Neural Network", IEEE Transactions on Pattern Analysis and Machine Intelligence, vol. 39, No. 1 [retrieved Sep. 20, 2021[. Retrieved from the Internet <https://citeseerx.ist.psu.edu/viewdoc/download?doi=10.1.1.722.4133&rep=rep1&type=pdf>., Mar. 2016, 9 Pages.

*Primary Examiner* — Jeffrey J Chow
(74) *Attorney, Agent, or Firm* — FIG. 1 Patents

(57) ABSTRACT

Semantic vectorization techniques are described that support generating and editing of vector objects from raster objects. A raster object, for instance, is received as an input by a semantic vectorization system. The raster object is utilized by the semantic vectorization system to generate a semantic classification for the raster object. The semantic classification identifies semantic objects in the raster image. The semantic vectorization system leverages the semantic classification to generate vector objects. As a result, the vector objects resemble the semantic objects in the raster object.

20 Claims, 13 Drawing Sheets
(8 of 13 Drawing Sheet(s) Filed in Color)

(56) References Cited

U.S. PATENT DOCUMENTS

| | | | |
|---|---|---|---|
| 2017/0287137 A1* | 10/2017 | Lin | G06V 10/454 |
| 2017/0372455 A1* | 12/2017 | Winnemoeller | G06T 7/13 |
| 2020/0026928 A1* | 1/2020 | Rhodes | G06T 7/194 |
| 2020/0167981 A1* | 5/2020 | Tagra | G06T 11/60 |
| 2020/0202533 A1* | 6/2020 | Cohen | G06T 7/194 |
| 2021/0279882 A1* | 9/2021 | Ikeda | G06T 3/40 |
| 2021/0374543 A1* | 12/2021 | Matsumoto | G06V 10/764 |
| 2022/0198209 A1* | 6/2022 | Spears | G06V 10/454 |
| 2024/0362744 A1* | 10/2024 | Kansara | G06T 11/00 |

\* cited by examiner

VECTOR OBJECT GENERATION FROM RASTER OBJECTS USING SEMANTIC VECTORIZATION

BACKGROUND

Billions of digital images are readily available to content creators due to the prevalence of digital cameras as part of mobile phones. The digital images captured by digital cameras are raster objects. Raster objects include a collection of pixels, and as such, raster objects lose visual quality with scaling. Accordingly, this digital content is not usable for effective scaling and thus is often ignored or is otherwise considered unavailable as part of creation of digital content.

Vector objects, on the other hand, are used to create a wide range of digital content due to the flexibility and accuracy in portraying the objects when rendered for display by a display device. Vector objects are mathematically generated using paths defined by start and end points. This enables vector objects to be scaled and modified by a computing device without a loss in visual quality. However, in order to utilize the functionality of vector objects, the content creator creates vector objects from scratch or edits a multitude of extraneous vector objects output by conventional techniques. This creating and editing involves complex combinations of a wide range of individual tools, tasking even experienced users with hours of interaction to create manually.

SUMMARY

Semantic vectorization techniques are described, as implemented by computing devices, to generate digital content that includes vector objects converted from raster objects. This is performed by leveraging a semantic classification of the pixels of the raster objects to produce vector objects. A digital image, for instance, is received as an input by the semantic vectorization system, e.g., as captured by a digital camera. This digital image includes a raster object that is utilized by the semantic vectorization system to generate a semantic classification of the pixels of the raster object. This semantic classification indicates how the raster object of the digital image is semantically parsed into vector objects that correspond to one or more semantic objects. As a result, these techniques significantly reduce the time and computational resources involved in creating and interacting with vector objects generated from source digital images.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The detailed description is described with reference to the accompanying figures. Entities represented in the figures are indicative of one or more entities and thus reference is made interchangeably to single or plural forms of the entities in the discussion.

DETAILED DESCRIPTION

Overview

Figure 1:
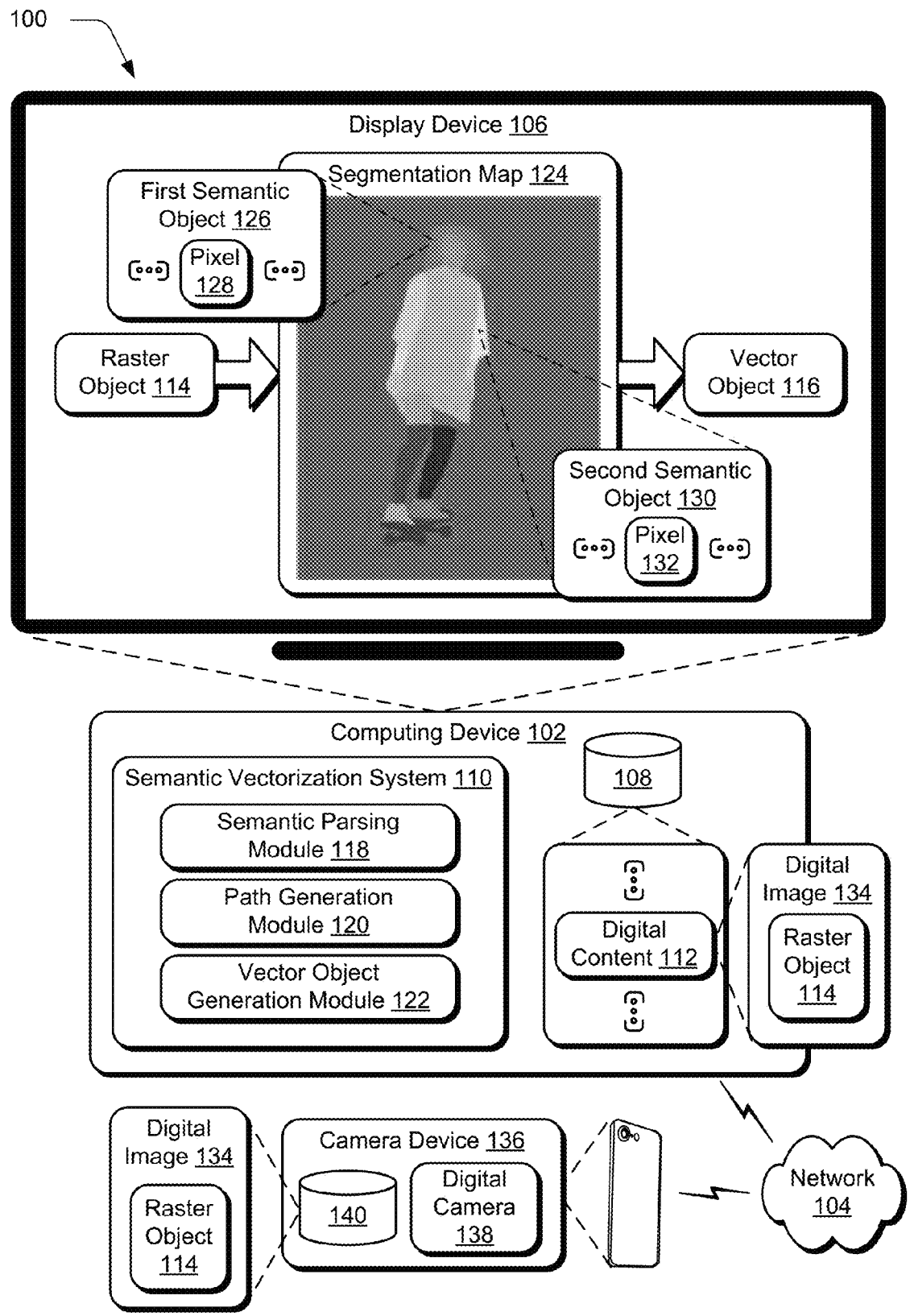
FIG. 1 is an illustration of a digital medium semantic vectorization environment in an example implementation that is operable to employ semantic vectorization techniques described herein.

Due to the prevalence of digital cameras as part of mobile phones, billions of digital images are readily available to content creators. The digital images sourced from digital cameras are in the form of raster objects composed of pixels. Although these raster objects are readily available, inclusion of raster objects as part of digital content typically introduces inaccuracies and visual artifacts, e.g., in order to scale the raster objects. Because raster objects of digital images are not usable for effective scaling, the billions of readily available digital images are often ignored or otherwise considered unavailable as part of creation of digital content. On the other hand, vector objects are often used in digital content because vector objects are scalable without a reduction in quality. In order to convert digital images of raster objects to vector objects, conventional techniques employed by content creation applications, however, often fail to accurately produce semantically relevant vector objects, resulting in hundreds of semantically irrelevant vector objects in a single image that are not directly usable by a content creator. As a result, the content creator must either correct the resulting vector objects or create the vector objects from scratch, both techniques involving significant amounts of manual user interaction. This manual user interaction is prone to error, results in user frustration, and leads to inefficient use of computational resources that implement these conventional techniques due to the inaccuracies.

Raster objects, for instance, include pixels that contain color information. Because raster objects are pixel-based, the raster object is resolution dependent. Consequently, scaling of raster objects typically causes visual artifacts, e.g., as the raster object is scaled up, the pixels of the raster object are noticeable and appear pixelated. Vector objects, on the other hand, are defined mathematically (e.g., as a collection of Bézier curves) to include paths and control points. As a result, vector objects are resolution-independent, indicating an ability to scale indefinitely without appearing pixelated. Conventional techniques to produce vector object from raster objects, however, are inefficient, inaccurate, prone-to-error, and result in inefficient use of computational resources.

Accordingly, semantic vectorization techniques are described that overcome these limitations to support generation of vector objects. A semantic object, for instance, is an object that has a semantic meaning to a human being, e.g., as a particular object, part of a scene, and so on. Examples of semantic objects include hair, skin, body parts, clothing, animals, cars, landscape features such as grass, background, and so forth. Semantic classification models, such as a semantic parsing model, employ machine-learning techniques to identify semantic objects in visual information, such as in digital images received from a digital camera. The semantic vectorization techniques utilize semantic classification models to identify these semantic objects depicted in raster objects using machine learning and generate semantic vector objects based on this identification by leveraging knowledge of "what" is represented semantically by respective pixels. By generating vector objects that depict semantic objects in raster objects, the vector objects support editing in a wide range of scenarios to produce a desired appearance, instead of manual generation of the vector objects that leads to errors. These techniques overcome the technical challenges of conventional techniques to generate vector objects that are semantically relevant directly from source images, reducing manual user interaction and improving the accuracy and computational efficiency of computing devices that implement these techniques. By improving the accuracy and computational efficiency of the computing devices, computational resources are freed-up, allowing additional digital images to be converted into vector objects.

Consider an example in which a digital image including a raster object is received as an input by a semantic vectorization system that depicts a dog in a field of grass. This digital image including the raster object is passed into a semantic classification model that parses the raster object via semantic classification of the pixels of the raster object, e.g., semantic tags assigned to individual pixels. Training of the semantic classification model involves training data, such as training raster objects depicting dogs or parts of dogs and corresponding ground truth semantic classification data indicating which pixels correspond to dogs in the training raster objects. Once trained, the semantic classification model generates a semantic classification of the raster object, e.g., to generate semantic tags corresponding to a semantic class, for which, the model is trained. Accordingly, the semantic classification model assigns the pixels of the raster object that correspond to the dog with a semantic class (e.g., tag) of "dog" and assigns the pixels that correspond to the grass with a semantic class of as "background." In some instances, the "dog" semantic class includes data indicating that the "dog" semantic class is part of an "animal" semantic type.

Then, the semantic classification is utilized to generate semantic clusters of pixels, e.g., a dog cluster and a background cluster. A cluster of pixels is generated by identifying pixels of the same semantic class are near or next to each other (e.g., within a defined threshold proximity) to be in a group of pixels. In some instances, a cluster includes multiple groups of pixels of a respective semantic class that are proximal to each other and/or one or more pixels of a different semantic class identified to be included in the cluster. In this example, a first and second group of pixels are tagged with the "dog" semantic class, e.g., pixels of a body of the "dog" and pixels of a tail of the "dog" separated by a third group of pixels tagged as "background." The body group of pixels and the tail group of pixels are determined to be within a defined threshold proximity of each other, e.g., the threshold proximity is the width of 5 pixels and the proximity of the body and tail is the width of 2 pixels. As such, the third group of pixels tagged as "background" between the body group of pixels and the tail group of pixels are reassigned to be in the "dog" semantic class and part of the "dog" cluster. The resulting "dog" cluster includes the body group, the tail group and the third reassigned group. As a result, the raster object of the digital image is semantically parsed into two semantically relevant clusters of pixels, e.g., a "dog" cluster and a "background" cluster.

In some instances, an area that contains the cluster is determined and compared to a threshold area. In the "dog" example, the area of the "dog" cluster is compared to a threshold area for the "dog" semantic class, e.g., the area of the "dog" cluster is 100 pixels, and the threshold area for the "dog" semantic class is 50 pixels. Based on the comparison of areas, the cluster is removed or kept, and in this case, the "dog" cluster is kept. In one instance, the resulting clusters of pixels are rendered for display on a display device via a segmentation map, e.g., showing the "dog" cluster and a background cluster.

To generate a vector object, a path around the cluster is determined, e.g., a path around the "dog" cluster. A path around a given cluster mimics the contours of the cluster. In one instance, the path includes control points to define an outline around the cluster of pixels. The path, for instance, is configurable as a plurality of lines and curves, e.g., Bézier curves. In some instances, control points are added or removed based on one or more path rules, e.g., removing collinear control points. The resulting path around the cluster is formed as a closed path and leveraged as the boundary of the vector object. In the "dog" example, the path around the "dog" cluster is leveraged to generate a "dog" vector object, mimicking the shape of the "dog" depicted in the raster object.

Additional vector objects, for instance, are generated. In some instances, the additional vector objects include shading vector objects that are generated based on the "dog" vector object for a dimensional appearance having increased realism. Shading vector objects are determined based on a shading area that is identified, such as shadows, highlights, and detail features. For the "dog" example, shadows are added near the edges of the "dog" vector object, and facial features are added in the area identified to be the dog's face.

In one instance, these techniques are performed responsive to user inputs received via a user interface, e.g., inputs that customize vector object generation such as inputs from user controls for a threshold area of clusters, path rules, color of the vector object, parameters for generating shading vector objects, and so forth. In another instance, these techniques are performed automatically and without user intervention. As a result of both instances, vector objects are generated that correspond to respective semantic objects in a raster object.

By passing a raster object of a digital image to a model that semantically parses the raster object, these techniques generate accurate and semantically relevant vector objects from raster objects. As such, the techniques described overcome the limitations of conventional techniques by reducing the amount of manual user interaction to generate vector objects from raster objects. This reduction results in an increased efficiency in the use of computational resources that implement these techniques. Further discussion of these and other examples is included in the following sections and shown using corresponding figures.

In the following discussion, an example environment is described that employs the techniques described herein. Example procedures are also described that are performable in the example environment as well as other environments. Consequently, performance of the example procedures is not limited to the example environment and the example environment is not limited to performance of the example procedures.

Example Environment

FIG. 1 is an illustration of a digital medium semantic vectorization environment 100 in an example implementation that is operable to employ semantic vectorization techniques described herein. The illustrated environment 100 includes a computing device 102 and a camera device 136 connected to a network 104. The computing device 102 is configurable as a desktop computer, a laptop computer, a mobile device (e.g., assuming a handheld configuration such as a tablet or mobile phone), and so forth. Thus, the computing device 102 is capable of ranging from a full resource device with substantial memory and processor resources (e.g., personal computers, game consoles) to a low-resource device with limited memory and/or processing resources (e.g., mobile devices). In some examples, the computing device 102 is representative of a plurality of different devices such as multiple servers utilized to perform operations "over the cloud" as described in FIG. 13.

The illustrated environment 100 also includes a display device 106 that is communicatively coupled to the computing device 102 via a wired or a wireless connection. A variety of device configurations are usable to implement the computing device 102 and/or the display device 106. The computing device 102 includes a storage device 108 and a semantic vectorization system 110. The storage device 108 is illustrated to include digital content 112. Examples of digital content 112 include raster objects 114 such as digital images 134 from digital cameras 138, vector objects 116 such as digital graphic artwork, digital videos, and any other form of content that is configured for rendering for display in a user interface by a display device 106.

The camera device 136 is a device that includes a digital camera 138 capable of capturing digital images 134 including the raster object 114 and a storage device 140 configured to store the digital images 134. In this example, the camera device 136 transmits the digital image 134 to the network 104. In some instances, the digital image 134 is then available to the semantic vectorization system 110 of the computing device 102, e.g., by receiving the digital image 134 from the camera device 136 via the network 104, via download from the Internet, and so forth. The storage device 108 stores the digital image 134 as part of the digital content 112.

The semantic vectorization system 110 is implemented at least partially in hardware of the computing device 102 to process and transform digital content 112, such as the digital image 134. Such processing includes creation of the digital content 112, modification of the digital content 112, and rendering of the digital content 112 in a user interface for output, e.g., by a display device 106. Although illustrated as implemented locally at the computing device 102, functionality of the semantic vectorization system 110 is also configurable as whole or part via functionality available via the network 104, such as part of a web service or "in the cloud."

A raster object 114, such as a digital image 134 as part of digital content 112, is implemented as a bitmap having a dot matrix data structure that represents a plurality of pixels. A bitmap (i.e., a single-bit raster) corresponds bit-for-bit with an object displayed by a display device. A raster object 114 is generally characterized by a width and height of the graphic in pixels and by a number of bits per pixel, or color depth, which determines the number of colors represented. Raster objects 114 may be found in a variety of graphic file formats, examples of which include joint photographic experts group (JPEG), portable network graphics (PNG), animated portable network graphics (APNG), graphics interchange format (GIF), moving picture experts group (MPEG) 4, and so forth. The raster object 114 may be identified via user input or automatically by the semantic vectorization system 110 as a graphic or as part of a graphic.

Vector objects 116, on the other hand, are defined mathematically, e.g., using control points that are connected by curves, to form shapes, polygons, and so forth. Each of these control points are defined on an X/Y axis and are used to determine a direction of a path through the use of handles. The curve may also have defined properties, including stroke color, shape, curve, thickness, fill, and so forth. Bezier curves are an example of type of parametric curve that is used to define a vector object 116. Bezier curves, for instance, may be used to model smooth curves that can be scaled indefinitely. Curves may be joined together, which are referred to as paths. The vector object generated from a path may include the defined properties of the path, including path shape, stroke color, curve, path thickness, as well as defined vector object properties, including fill color, semantic class, associated vector objects, and so forth. Vector objects 116 may be found in a variety of graphic file formats, examples of which include scalable vector graphics (SVG), encapsulated postscript (EPS), and portable document format (PDF).

The semantic vectorization system 110 is configured to generate a vector object 116. The semantic vectorization system 110 employs a semantic parsing module 118, a path generation module 120, and a vector object generation module 122. The semantic parsing module 118 is configured by the semantic vectorization system 110 to generate a segmentation map 124 e.g., by parsing the raster object 114 of a digital image 134 into semantic objects. The segmentation map 124 includes a first semantic object 126 including pixels 128 and a second semantic object 130 including pixels 132. The path generation module 120 leverages the segmentation map to generate a path around pixels of a semantic object. The vector object generation module 122 is configured to leverage the segmentation map 124 and generate vector objects 116. Through use of semantic parsing, accuracy and semantic relevancy in generation of a vector object 116 from a digital image 134 is improved, thereby also improving operation of a computing device 102 as further described in the following sections.

In general, functionality, features, and concepts described in relation to the examples above and below are employed in the context of the example procedures described in this section. Further, functionality, features, and concepts described in relation to different figures and examples in this document are interchangeable among one another and are not limited to implementation in the context of a particular figure or procedure. Moreover, blocks associated with different representative procedures and corresponding figures herein are applicable together and/or combinable in different ways. Thus, individual functionality, features, and concepts described in relation to different example environments, devices, components, figures, and procedures herein are usable in any suitable combinations and are not limited to the particular combinations represented by the enumerated examples in this description.

Semantic Vectorization

Figure 2:
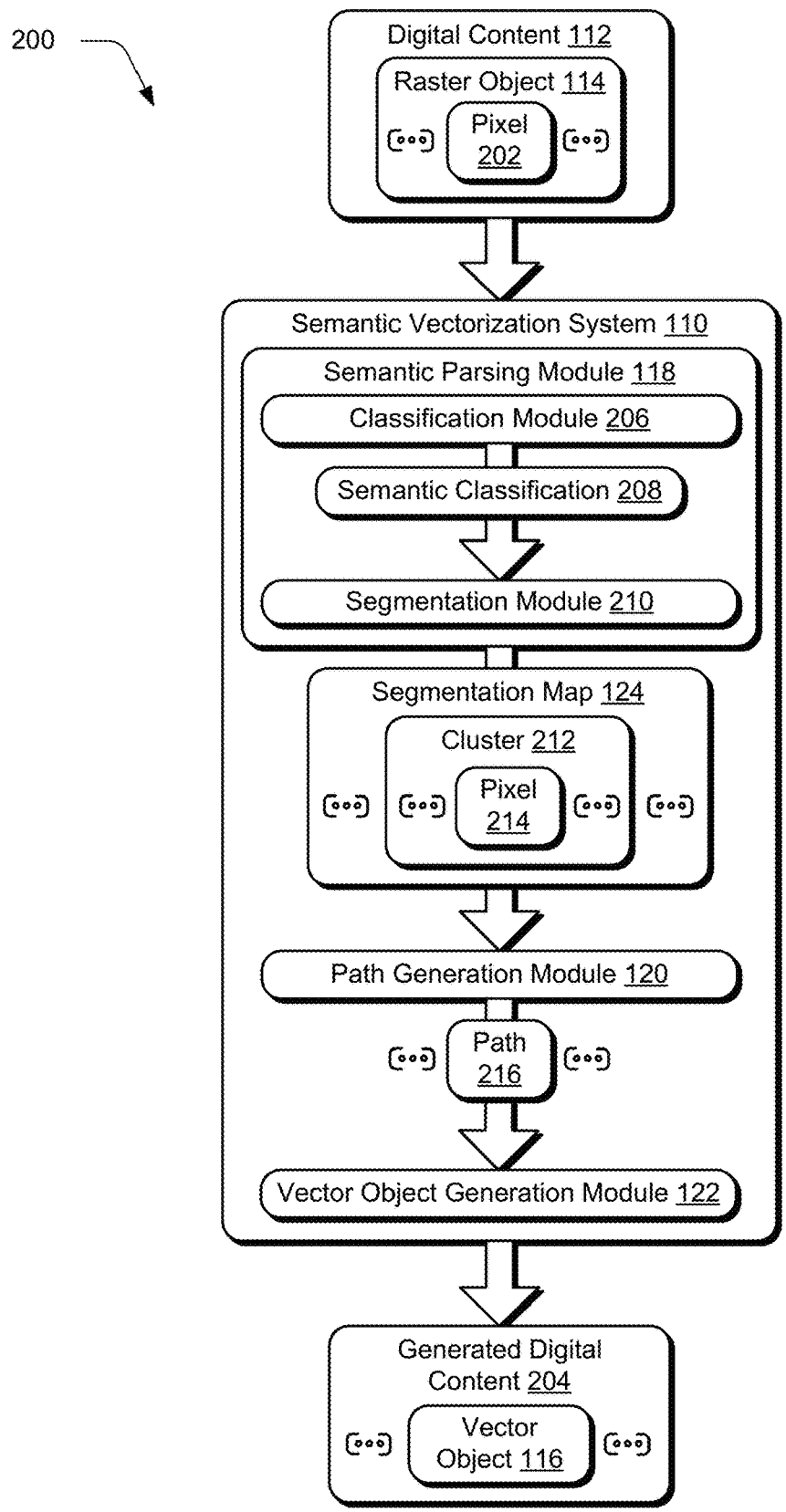
FIG. 2 depicts a system in an example implementation showing operation of a semantic vectorization system of FIG. 1 in greater detail.
Figure 3:
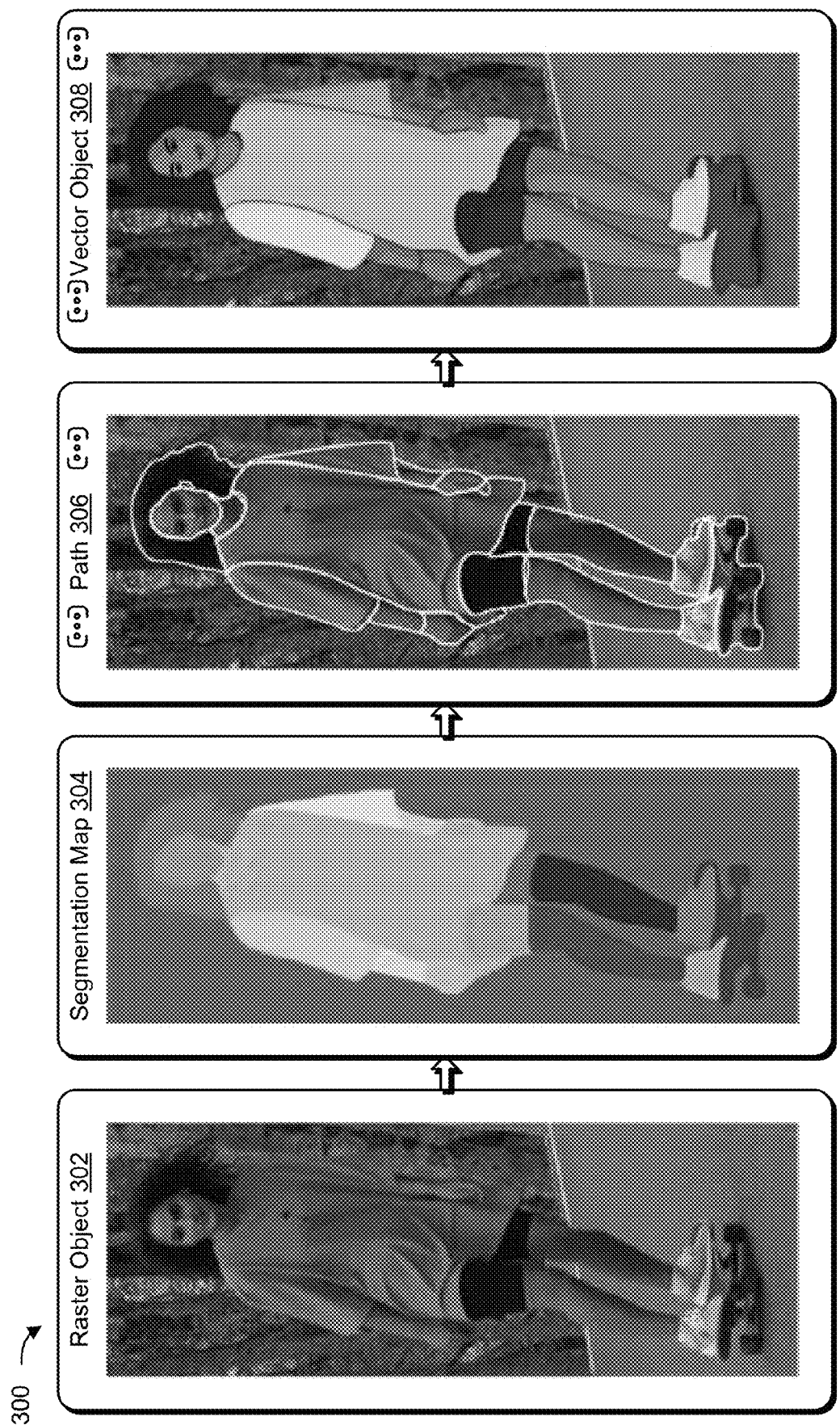
FIG. 3 depicts an example of a vector object generated from a raster object.
Figure 4:
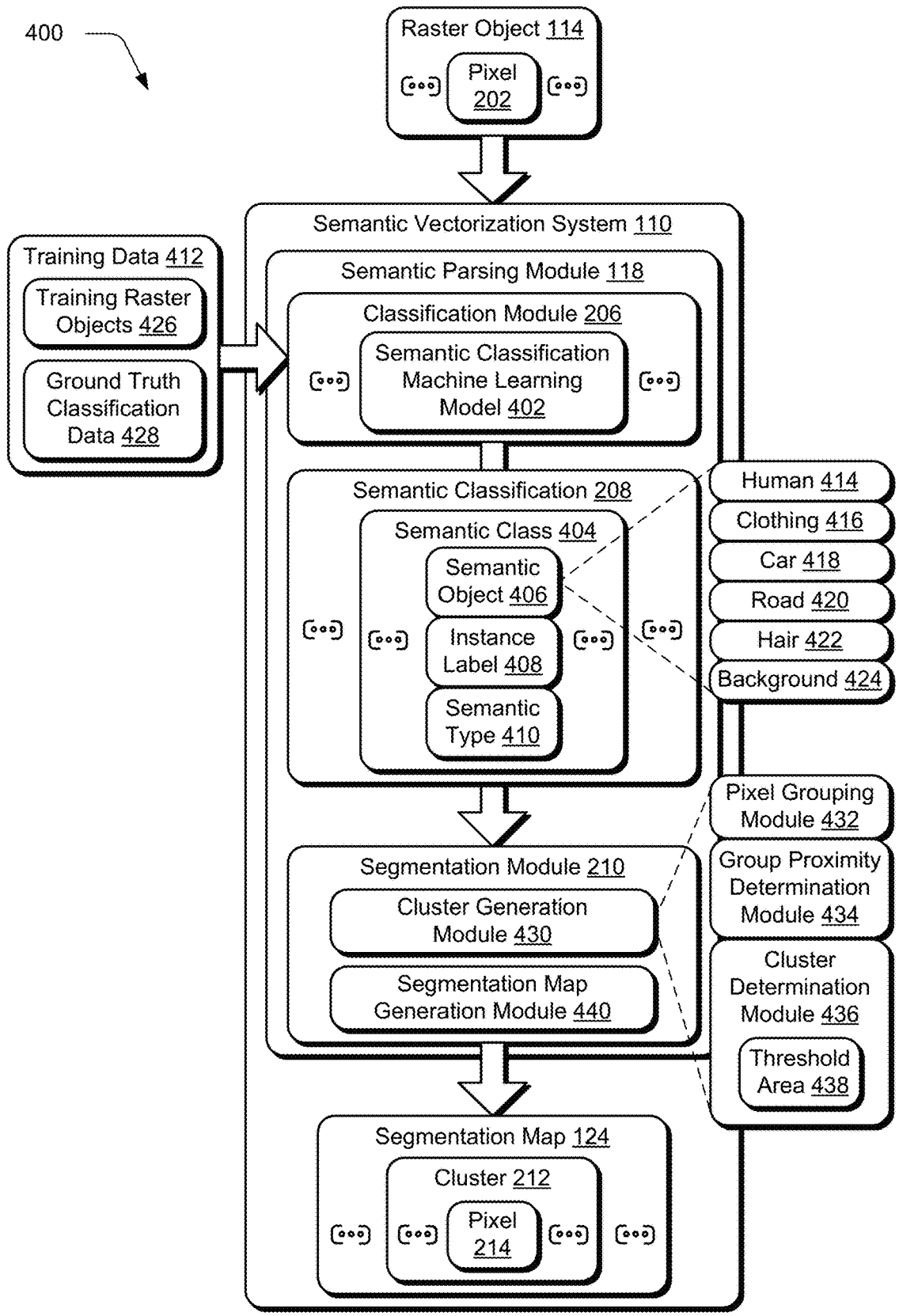
FIG. 4 depicts a system in an example implementation showing operation of a semantic parsing module of the semantic vectorization system of FIG. 2 in greater detail.
Figure 5:
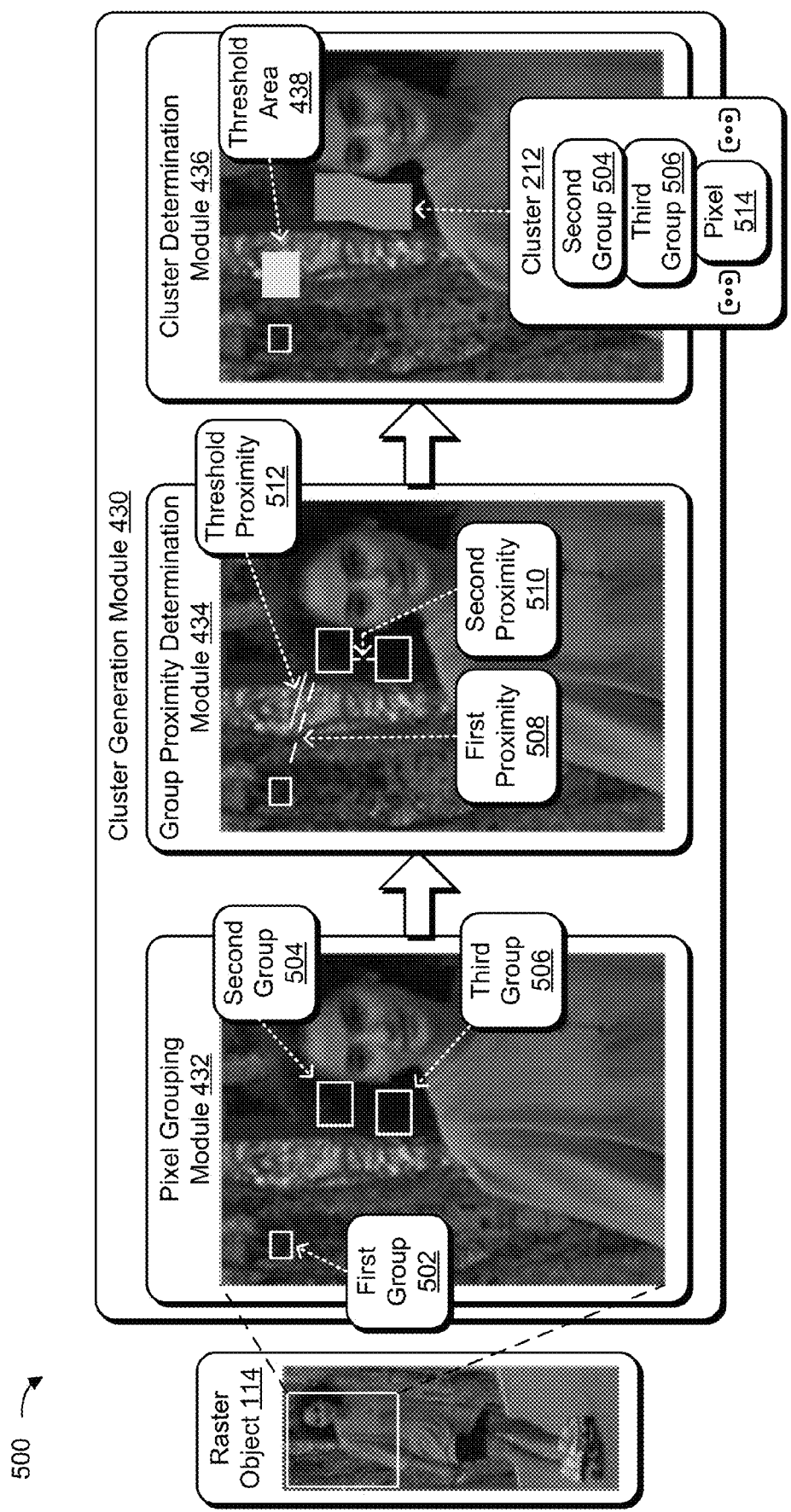
FIG. 5 depicts a system in an example implementation showing operation of a cluster generation module of the segmentation module of FIG. 4 in greater detail.
Figure 6:
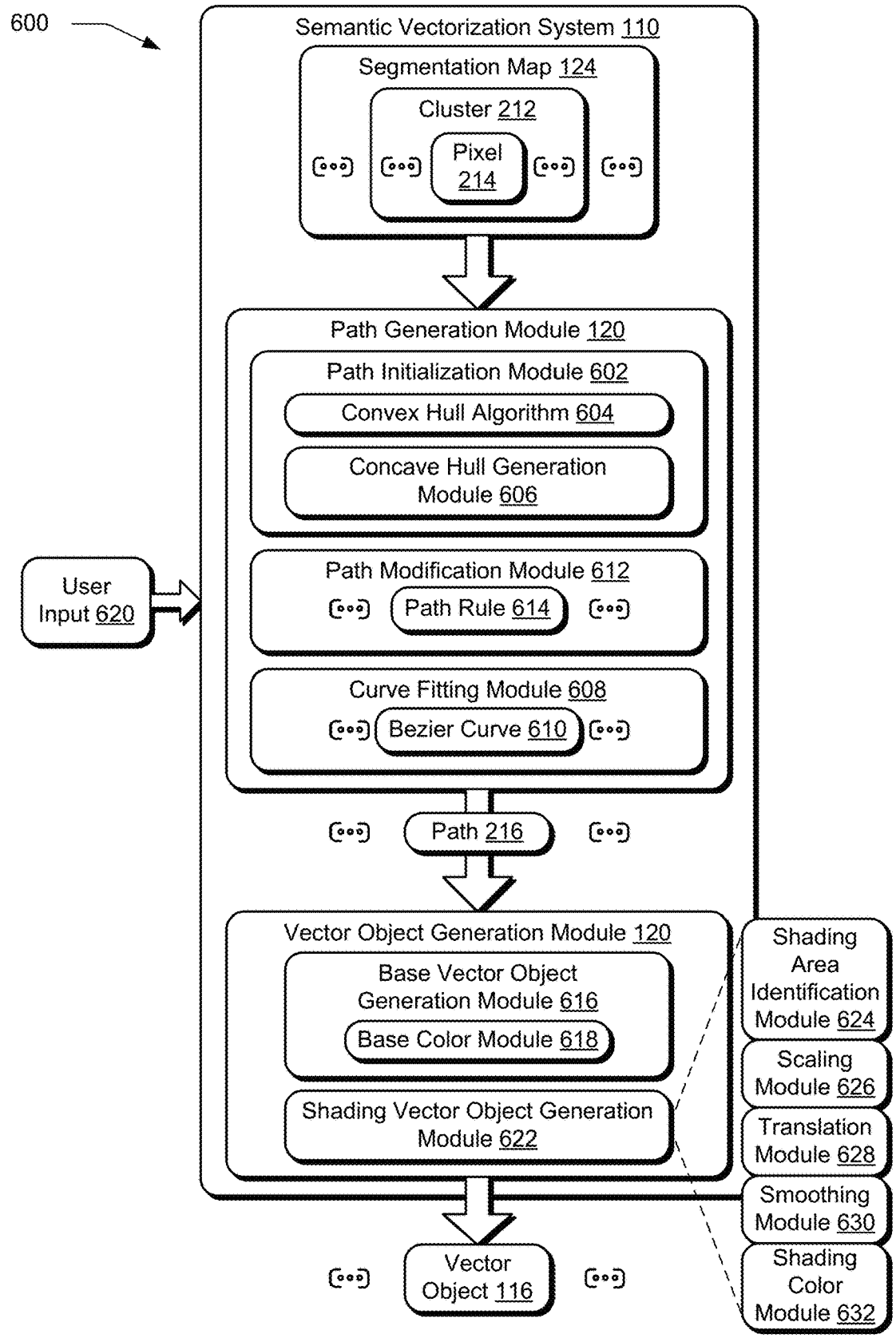
FIG. 6 depicts a system in an example implementation showing operation of a path generation module and vector object generation module of the semantic vectorization system of FIG. 2 in greater detail.
Figure 7:
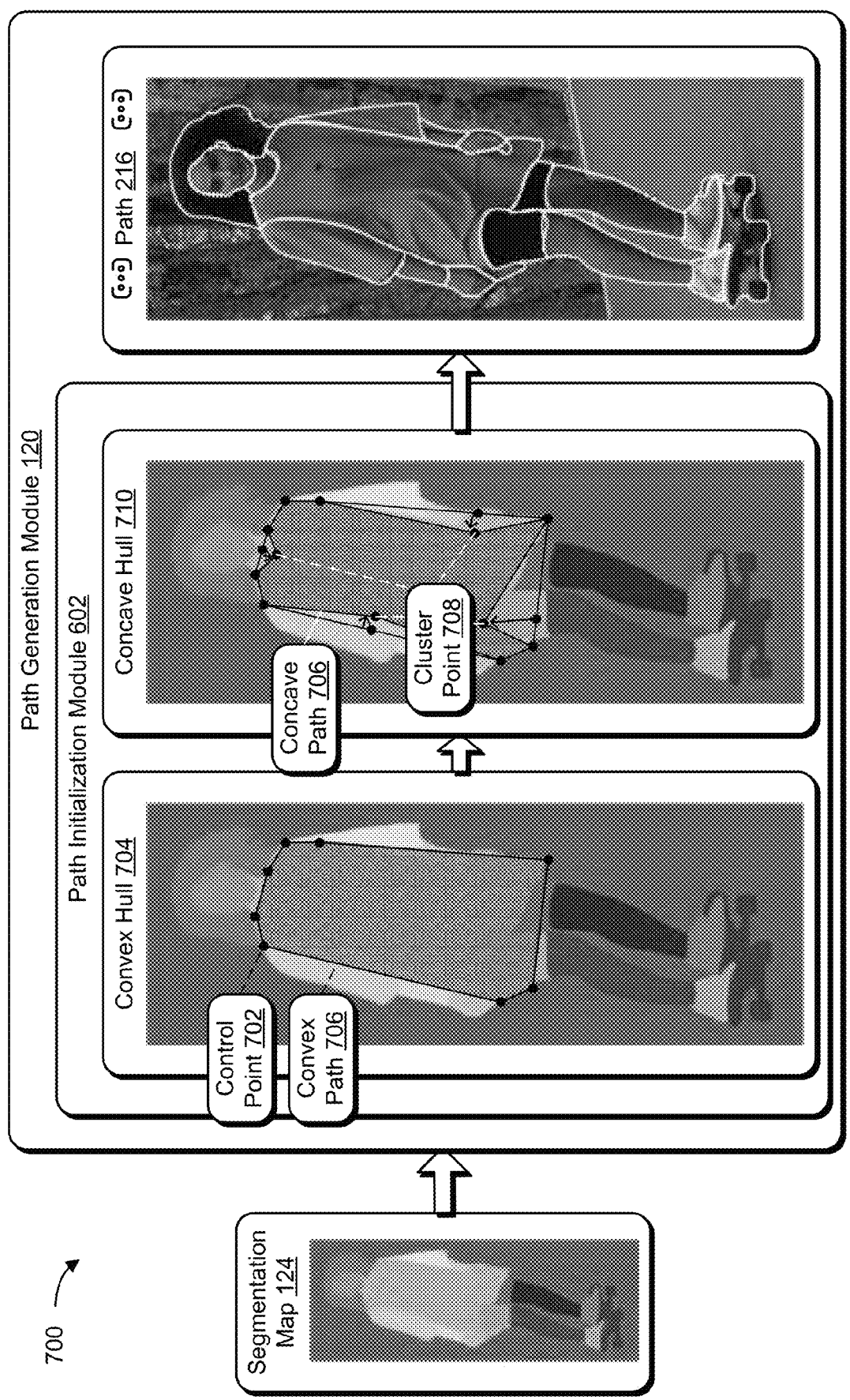
FIG. 7 depicts a system in an example implementation showing operation of a path initialization module of the path generation module of FIG. 6 in greater detail.
Figure 8:
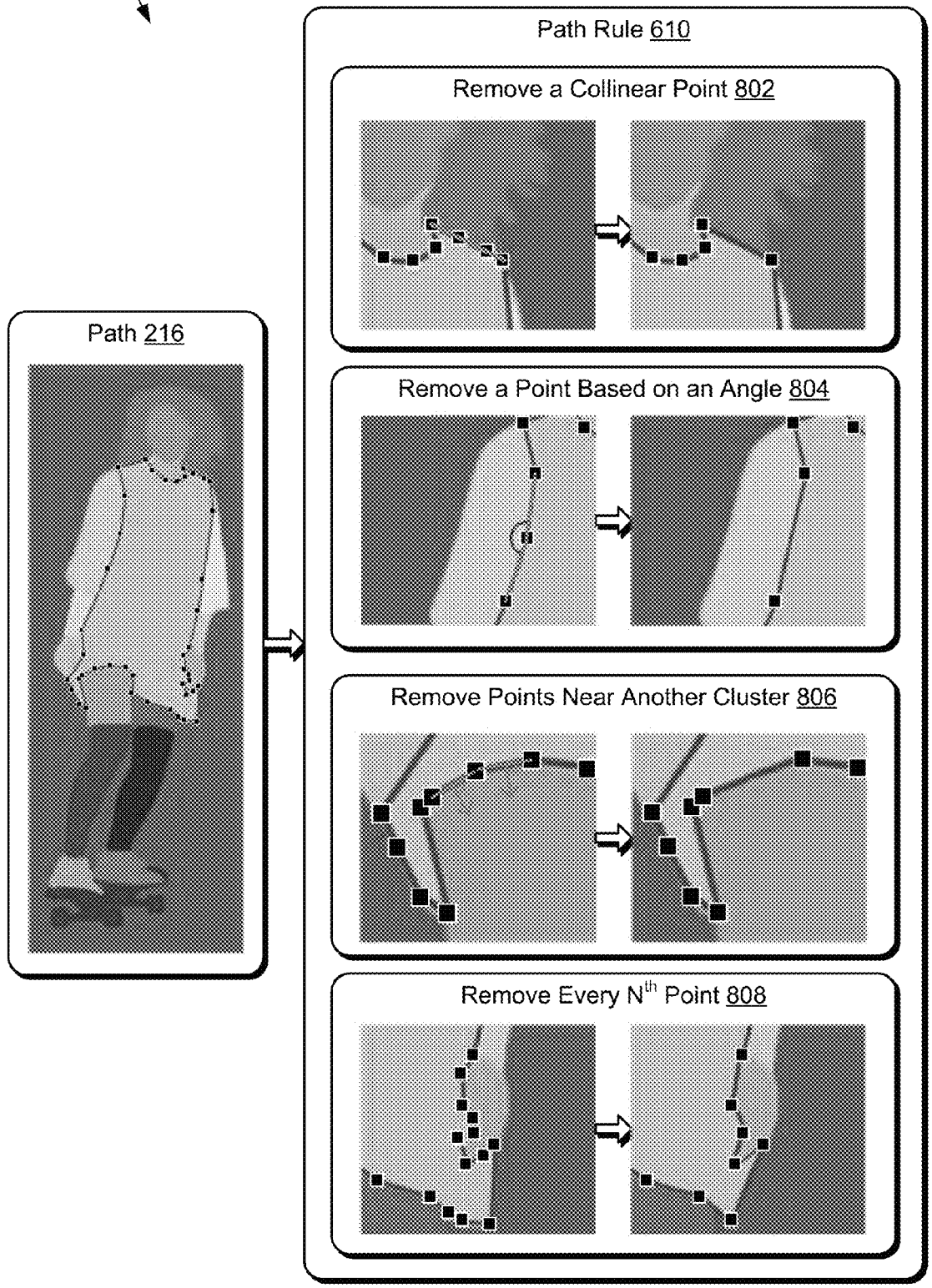
FIG. 8 depicts an example of path rules of FIG. 6 in greater detail.
Figure 9:
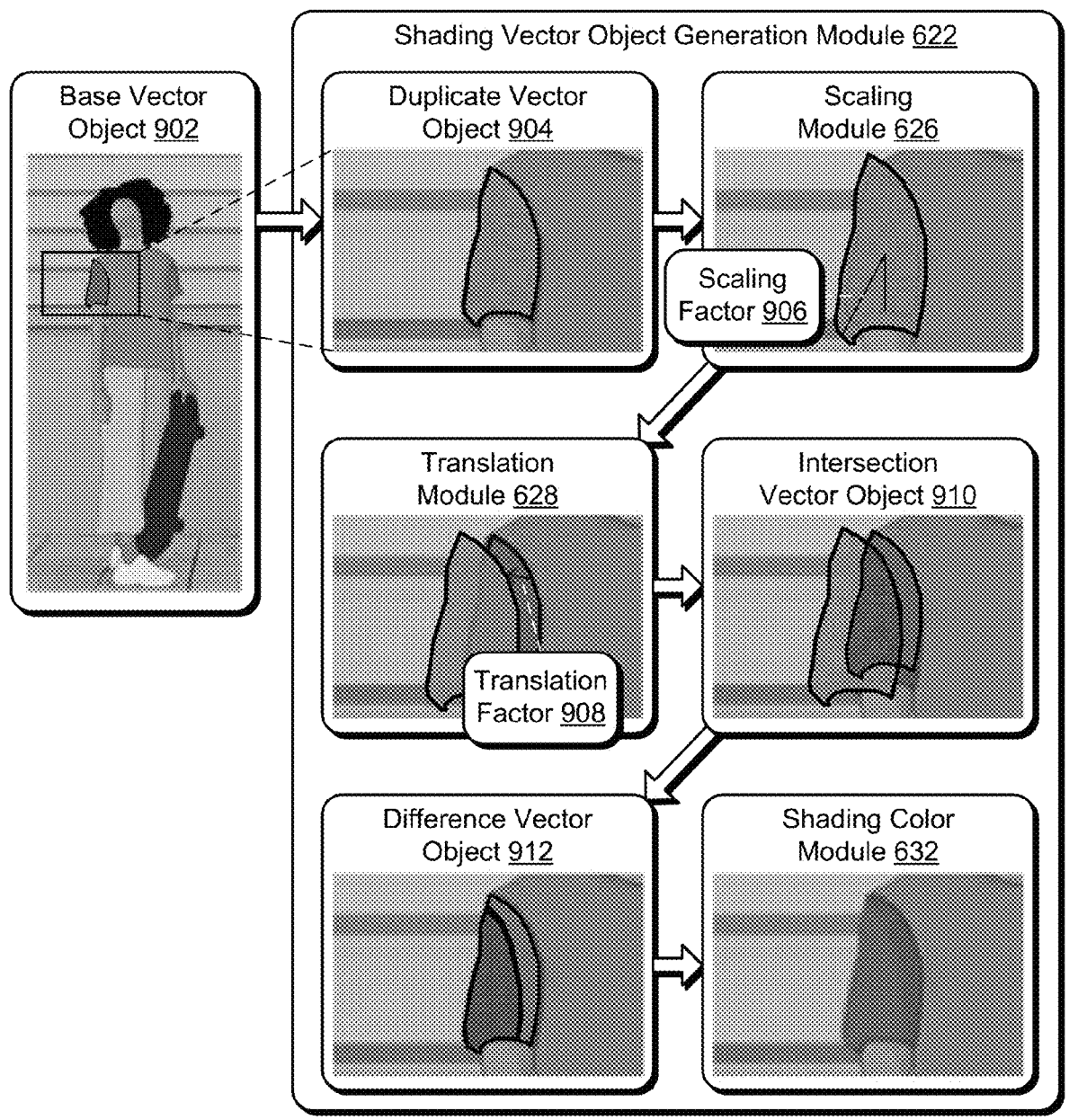
FIG. 9 depicts a system in an example implementation showing operation of a shading vector object generation module of FIG. 6 in greater detail.
Figure 10:
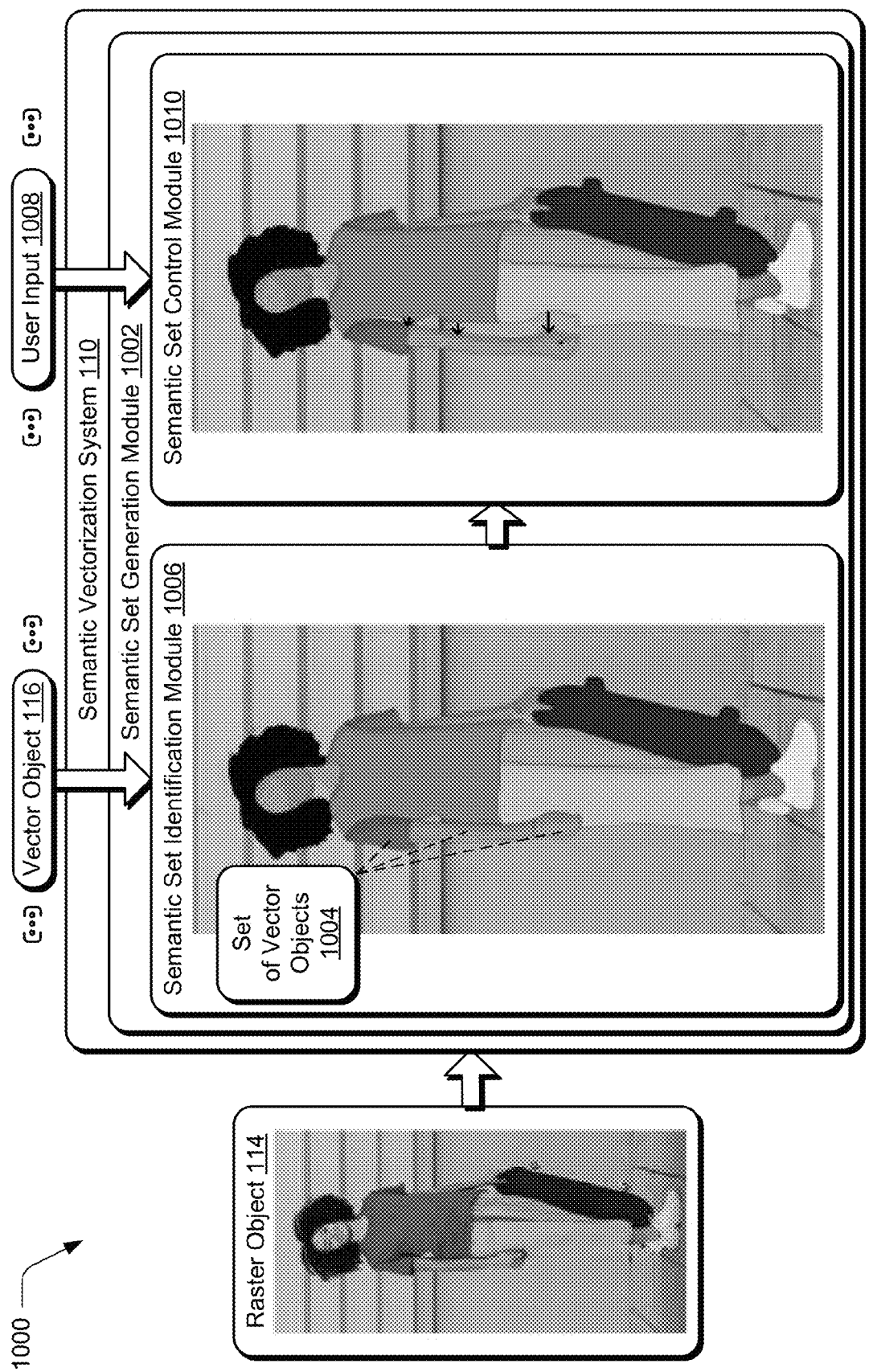
FIG. 10 depicts a system in an example implementation showing operation of a semantic set generation module of the semantic vectorization system.
Figure 11:
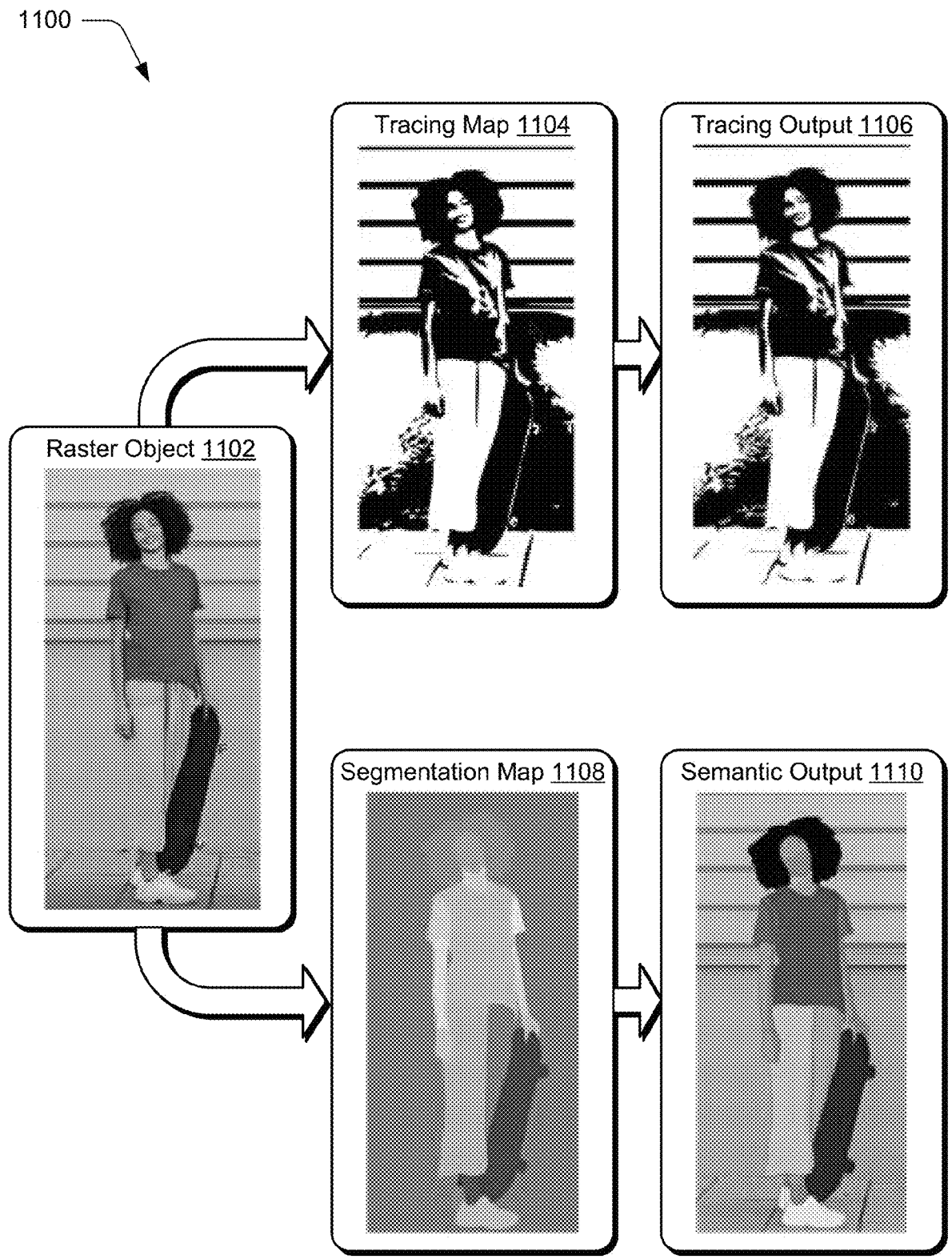
FIG. 11 depicts an example comparing outputs of conventional tracing techniques and semantic vectorization techniques.
Figure 12:
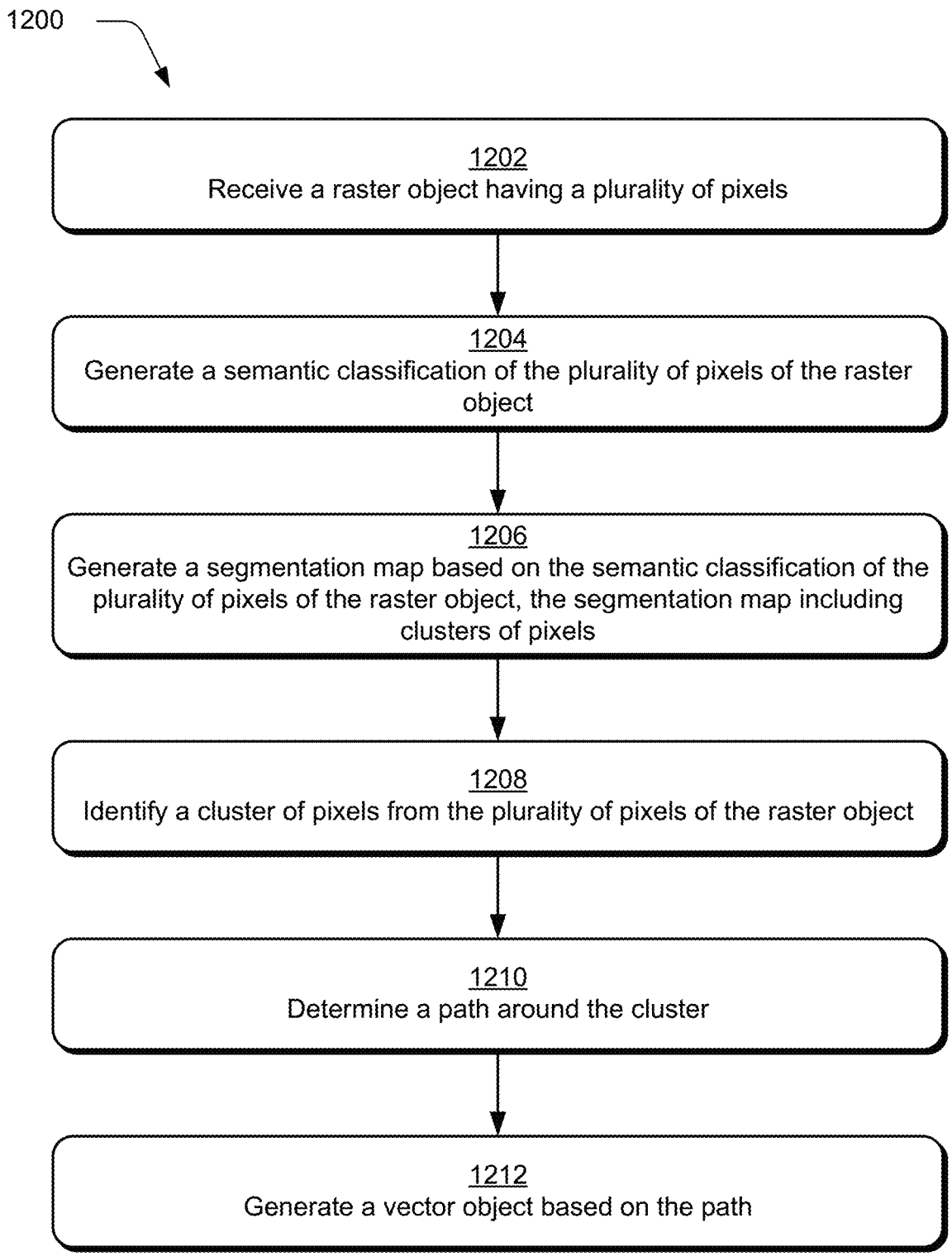
FIG. 12 is a flow diagram depicting a procedure in an example implementation of semantic vectorization from a raster object.

FIG. 2 depicts a system 200 in an example implementation showing operation of a semantic vectorization system 110 of FIG. 1 in greater detail. FIG. 3 depicts an example 300 of a vector object 116 generated from a raster object 114. FIG. 4 depicts a system 400 in an example implementation showing operation of a semantic parsing module 118 of the semantic vectorization system 110 of FIG. 2 in greater detail. FIG. 5 depicts a system 500 in an example implementation showing operation of a cluster generation module 430 of the segmentation module 210 of FIG. 4 in greater detail. FIG. 6 depicts a system 600 in an example implementation showing operation of a path generation module 120 and vector object generation module 122 of the semantic vectorization system 110 of FIG. 2 in greater detail. FIG. 7 depicts a system 700 in an example implementation showing operation of a path initialization module 602 of the path generation module 120 of FIG. 6 in greater detail. FIG. 8 depicts an example 800 of path rules 614 of FIG. 6 in greater detail. FIG. 9 depicts a system 900 in an example implementation showing operation of a shading vector object generation module 622 of FIG. 6 in greater detail. FIG. 10 depicts a system 1000 in an example implementation showing operation of a semantic set generation module 1002 of the semantic vectorization system 110. FIG. 11 depicts an example 1100 comparing outputs of conventional tracing techniques and semantic vectorization techniques. FIG. 12 is a flow diagram 1200 depicting a procedure in an example implementation of semantic vectorization from a raster object 114.

The following discussion describes techniques that are implementable utilizing the previously described systems and devices. Aspects of each of the procedures are implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference will be made to FIGS. 1-12.

To begin as shown in the system 200 of FIG. 2, digital content 112 including a raster object 114 is received as an input by the semantic vectorization system 110 (block 1202). In some instances, the raster object 114 is included in a digital image 134 captured by a camera device 136. The raster object 114 includes pixels 202. In one instance, the raster object 114 depicts a scene, e.g., a woman on a skateboard on a sidewalk with trees in the background as illustrated in FIG. 3 as a raster object 302. This digital content 112 is utilized by the semantic vectorization system 110 to generate digital content 204 that includes one or more vector objects 116 that mimic the visual appearance of the raster object 114.

First, a semantic parsing module 118 is utilized by the semantic vectorization system 110 to parse the raster object 114 into clusters of pixels that resemble semantic objects. As part of this, a classification module 206 of the semantic parsing module 118 is employed to impart a semantic classification 208 to the pixels 202 of the raster object 114 (block 1204), e.g., by using the classification module 206 as part of machine learning to assign semantic tags to individual pixels. This semantic classification 208 is leveraged by a segmentation module 210 to generate a segmentation map 124 including clusters 212 of pixels 214 (blocks 1206), e.g., the pixels 214 of clusters 212 share a particular semantic tag. The segmentation map 124 visually indicates the clusters 212 of pixels 214 representing the semantic objects 126 depicted in the raster object 114. A group of pixels is one or more pixels of a certain semantic class that are next to one another. In some instances, a cluster 212 includes multiple groups of pixels of a respective semantic class that are proximal to each other and/or one or more pixels of a different semantic class identified to be included in the cluster, e.g., pixels between the proximal groups. As illustrated in FIG. 3, a segmentation map 304 illustrates each cluster of pixels with a different color.

Then, a cluster 212 is identified (block 1208) to generate a vector object 116. To do so, a path generation module 120, configured by the semantic vectorization system 110, identifies a closed path 216 around the cluster 212 (block 1210), as illustrated by path 306 of FIG. 3. This path 216 is leveraged by a vector object generation module 122 to generate the vector object 116 (block 1212), as illustrated by vector object 308 of FIG. 3. The vector object includes defined properties of the path, such as path shape, stroke color, curve, path thickness, as well as defined properties of the vector object, such as fill colors, semantic class, associated vector objects, and so forth. Vector objects are configured to be editable, e.g., modifying a path of a vector object, changing the position of a vector object, and so forth. In some instances, a vector object is part of a set of vector objects determined based on the semantic class of the vector object and other vector objects in the set. The semantic vectorization system 110 displays the vector object 116 and corresponding generated digital content 204, e.g., on the display device 106. By leveraging the semantic classification of raster objects 114, the semantic vectorization system 110 generates more semantically relevant and more accurate vector objects 116 as compared to conventional techniques. As such, the semantic vectorization techniques reduce manual user interaction and improve the accuracy and computational efficiency of computing devices that implement these techniques.

In this example, a raster object 114 is received by the semantic vectorization system 110. The classification module 206 of the semantic parsing module 118 is configured to generate a semantic classification 208 for the raster object 114. The classification module 206, for instance, includes one or more semantic classification models. In some instances, the semantic classification model is configured as a machine learning model, such as a semantic parsing model, a model using artificial intelligence, a neural network, and so on.

A semantic classification machine learning model 402 assigns the pixels 202 of the raster object 114 to a semantic class 404 representing one or more semantic objects 406. The classification module 206, for instance, includes a series of semantic classification machine learning models 402, each identifying a semantic object 406. The semantic classification machine learning models 402 identify a corresponding semantic object in the raster object and assign the pixels of the semantic object to a semantic class that corresponds with the semantic object. For example, a "hand" classification machine learning model identifies a hand in the raster object and assigns pixels identified to correspond with the "hand" semantic object to a "hand" semantic class. In some instances, an aggregation model of the classification module 206 combines the outputs of each semantic object classification model, e.g., such that each pixel belongs to a single semantic class.

In some instances, the semantic class is an instance label 408 indicating each instance of a semantic object 406 of the semantic class 404, such that each instance of "hand" semantic objects has a unique instance label. In another instance, the semantic class 404 is a semantic type 410 that indicates a larger group of semantic classes in a hierarchy of which the semantic class 404 belongs, e.g., a "forearm" semantic class and "hand" semantic class are part of an "arm" semantic type. Any one or combination of semantic class tags are considered.

To generate the semantic classification 208, the semantic classification machine learning model 402 is trained as part of machine learning. Training of a semantic classification machine learning model 402 includes input of training data 412 to learn how to identify semantic objects, e.g., a human 414, an article of clothing 416, a car 418, a road 420, hair 422, a background 424, and so forth. The training data include training raster objects 426 of a particular semantic object and corresponding ground truth classification data 428, such as training raster objects depicting a hand or part of a hand and ground truth classification data identifying what pixels correspond with the hand or part of a hand Once trained, the semantic classification machine learning model 402 is configured to impart this semantic classification to an input, e.g., pixels of the raster object 114.

Then, a cluster generation module 430 of the segmentation module 210 is configured to determine clusters of pixels based on the semantic classification 208. A pixel grouping module 432, a group proximity determination module 434, and a cluster determination module 436 are leveraged to generate the clusters of pixels.

As illustrated in FIG. 5, for example, a first group 502 of pixels, a second group 504 of pixels, and a third group 506 of pixels of the raster object 114 are identified by the pixel grouping module 432. The three groups of pixels are distinct from each other, e.g., none of the groups share pixels or include pixels that are adjacent to pixels in another group. In this example, the first group 502 is incorrectly identified as being in a semantic class (e.g., identified as hair but depicts a tree), but the second group 504 and third group 506 are correctly identified in the semantic class. The group proximity determination module 434 identifies a proximity between groups of pixels that are next to or near each other in a certain semantic class. In the example illustrated in FIG. 5, a first proximity 508 is determined between the first group 502 and the second group 504 and a second proximity 510 is determined between the second group 504 and the third group 506.

In a first instance, the group proximity determination module 434 determines whether to combine two groups of pixels with the same semantic class based on a proximity between the two groups. For instance, the group proximity determination module 434 compares the identified proximity to a threshold proximity In this example, the first proximity 508 is greater than the threshold proximity 512 and the second proximity 510 is less than the threshold proximity 512. Thus, the group proximity determination module 434 determines that the second group 504 and the third group 506 are close enough to be combined, whereas the first group 502 is not close enough to the second group 504 to be combined.

After the group proximities are determined, the cluster determination module 436 converts the groups of pixels into clusters. Each cluster includes data identifying a respective semantic class of the pixels of the cluster. In some instances, the cluster determination module 436 determines to include one or more pixels that do not have the respective semantic class of the two groups into the cluster, e.g., pixels 514 that are between the second group 504 and the third group 506. In a third instance, the cluster determination module 436 determines not to combine two groups based on the two groups being separate instances of a semantic object, e.g., as indicated by the instance labels 408.

In some instances, the cluster determination module 436 identifies groups or combined groups of pixels that are large enough to be a cluster, e.g., by comparing an area that encloses a group of pixels to a threshold area 438. The threshold area 438, for instance, is a threshold area for all semantic classes. Alternatively, each semantic class has a corresponding threshold area 438. In the example illustrated by FIG. 5, the area of first group 502 is not greater than the threshold area 438, and thus is not determined to be a cluster. Conversely, the cluster determination module 436 determines the combination of the second group 504, the third group 506, and the additional pixels 514 is a cluster based on an area of the groups and additional pixels being greater than the threshold area 438. As a result, one or more clusters 212 are generated by the cluster generation module 430.

Returning to the example system of FIG. 4, a segmentation map generation module 440 is configured by the semantic parsing module 118 to generate a segmentation map 124. As part of this, the segmentation map generation module 440 compares pixels of a first cluster to pixels of a second cluster. If, for instance, there is overlap between the first and second clusters 212 (i.e., one or more pixels were clustered into more than one cluster 212) the segmentation map generation module 440 determines a single cluster for the overlapping one or more pixels, such as based on the semantic classification. As such, a segmentation map 124 is generated by the segmentation module 210 to show the clusters 212 of pixels 214. In some instances, the segmentation map 124 is rendered for display on the display device 106.

The segmentation map 124 including clusters 212 of pixels 214 is input to the path generation module 120 of the semantic vectorization system 110. In one example as illustrated in FIG. 6, a path initialization module 602 generates an initial path around a cluster 212 of pixels 214. For instance, the path initialization module 602 identifies points on the cluster 212 to place initial control points. As illustrated in FIG. 7, a convex hull algorithm 604 identifies outermost points of the cluster 212 of pixels 214 and determines control points 702 that correspond to the outermost points. As a result, a convex hull 704 is formed with a convex path 706, where each interior angle of the convex hull is less than 180°.

Then, a concave hull generation module 606, in some instances, identifies a point on the convex path that does not correspond with the corresponding cluster of pixels. The concave hull generation module 606 determines a cluster point 708 on the cluster of pixels (e.g., the closest pixel of the cluster to the identified point on the convex path) to replace the identified point. The cluster point 708 becomes a new control point of the path, resulting in a concave hull 710, where one or more interior angles of the concave hull is not less than 180°. In some instances, the concave hull generation module 606 goes around the path until each control point of a given distance corresponds to pixels 214 of the cluster 212. Other path initialization techniques are considered, such as generating control points and a corresponding path from a randomly selected set of points on the outline of the cluster 212.

Returning to the example of FIG. 6, a path modification module 608 is configured by the path generation module 120 to refine the initial path and generate a modified path. In some instances, a modification of the initial path is based on a path rule 610. Examples of the path rules include removing a control point that is collinear to two adjacent control points (block 802), removing a control point based on an angle of line segments between a subject control point and two adjacent control points (block 804), removing a control point based on determining that an endpoint of a unit normal vector of a line segment between two control points overlaps a different cluster or vector object (block 806), removing every $N^{th}$ point (block 808 where N=2), and so forth.

Alternately or additionally, a curve fitting module 612 is configured to employ a variety of different techniques to fit curves to the cluster 212, e.g., by generating curve fitting control points, leveraging the control points from the path initialization module 602, generating handles, and so forth. In some instances, the curve fitting module 612 detects contours in the outline of the cluster 212. In one instance, the curve fitting module 612 detects a linear portion of the cluster outline and accordingly performs line fitting for that portion. In another instance, the curve fitting module 612 detects a contour that is of higher order than a line segment. For these higher order contours, "pure" curve fitting is performed for that contour, e.g., using quadratic and cubic Bezier curves.

As a result, a path 216 is generated for clusters 212 of pixels 214. In some instances, the path 216 mimics but does not replicate the contours of the outline of the cluster, e.g., the path 216 surrounds one or more pixels or parts of pixels that are not part of the cluster 212 (as depicted in 306 with regards to the path around the skateboard) and/or does not surround one or more pixels that is part of the cluster.

A base vector object generation module 616 that is configured by the vector object generation module 122 utilizes the path 216 as the boundary of a base vector object. In some instances, the base vector object generation module 616 includes a base color module 618 to identify one or more colors to fill the base vector object. In one example, the base color module 618 identifies a subset of pixels within the cluster of pixels from which the base vector object was generated, e.g., the 10 pixels in the cluster. The base color module 618, for instance, averages the color values of the identified pixels and assigns the fill of the base vector object as the average color value. In another example, the base color module 618 receives user input 620 to assign the fill of the base vector object as a user-specified color.

After the base vector object is generated, a shading vector object generation module 622, for instance, leverages the base vector object to generate shading vector objects. Examples of shading vector objects include shadow vector objects, highlight vector objects, detail feature vector objects, such as facial features, visual patterns, and so forth. To generate a shading vector object, for instance, a shading area identification module 624 determines an area for a shading vector object, such as on the edge of a base vector object 902 for a shadow. The shading vector object generation module 622 duplicates the base vector object 902 for shading, resulting in a duplicate vector object 904.

The duplicate vector object is transformed, e.g., by scaling and translating the duplicate vector object. A scaling module 626 scales the duplicate vector object 904, e.g., based on a scaling factor 906. A translation module 628 translates the duplicate vector object, e.g., based on a translation factor 908 defined in X/Y axes. The shading vector object generation module 622 determines an intersection 910 of the base vector object and the transformed vector object. Then, the shading vector object generation module 622 determines a difference 912 between the intersection and the base vector object. The resulting vector object of the difference 912 is a shading vector object. Additionally, a smoothing module 630, for instance, simplifies or smoothens the path of the shading vector object, e.g., by a smoothing factor or a path rule as described herein. A shading color module 632, for instance, determines a color to fill the shading vector object e.g., based on the identified shading area, the corresponding base vector object, the semantic class of the vector object, etc. In some instances, the scaling factor, the translation factor, the smoothing factor, path rules, and the shading vector object color are exposed as user controls.

FIG. 10 depicts a system 1000 showing operation of a semantic set generation module 1002 of the semantic vectorization system 110. The semantic set generation module 1002 is configured to identify a set of vector objects 1004 such that the set of vector objects can be semantically controlled. A semantic set identification module 1006 is configured to determine a set of vector objects from a plurality of vector objects 116. The set of vector objects 1004 is based, at least in part, on the semantic classification, e.g., a semantic type shared by the vector objects in the set. The set of vector objects 1004 may include base vector objects and shading vector objects as described herein. In this example, vector objects are identified to be part of the set of vector objects 1004, e.g., a "hand" vector object, a "forearm" vector object, an "arm sleeve" vector object, and corresponding shading vector objects form the set of vector objects 1004 representing an arm. A semantic set control module 1010 is configured to determine how the set of vector objects 1004 are to be controlled based on the semantic class or classes of the vector objects, e.g., static and dynamic relationships between vector objects of the set and between the set of vector objects 1004 and the vector objects not in the set. These vector objects are then adjustable via user input 1008 by the semantic set control module 1010. The adjustments can be semantically defined based on the semantic classification, e.g., hinging the semantic set representing the arm around the top of the "arm sleeve" vector object.

FIG. 11 depicts an example comparing outputs of conventional tracing techniques and semantic vectorization techniques described herein. Image trace is a conventional solution to generate vector objects from raster objects based on color values of the pixels. However, tracing maps 1104 produced by image trace often provide unusable tracing outputs 1106 including hundreds of vector objects and paths that do not correspond to semantic objects of a raster object 1102, i.e., many vector objects are not semantically relevant. Oftentimes, manual converting of the trace outputs 1106 into usable vector objects involves significant amounts of manual user interaction that is prone to error, results in user frustration, and inefficient use of computational resources that implement these conventional tracing techniques due to the inaccuracies. In contrast, a segmentation map 1108 indicating semantic boundaries of semantic objects is generated from the raster object 114. The segmentation map 1108 generated from the semantic classification 208 is leveraged to produce a semantic output 1110 including vector objects that resemble the semantic objects of the raster object 114 as described herein. By leveraging the semantic classification of the raster object 114, the semantic vectorization system 110 generates more semantically relevant and more accurate vector objects 116 as compared to conventional techniques. The sematic output including vector objects reduces user interaction, and thus, computational resources that implement the semantic vectorization techniques are used efficiently. Accordingly, the semantic vectorization system as described herein is an improvement over the conventional techniques.

Example System and Device

Figure 13:
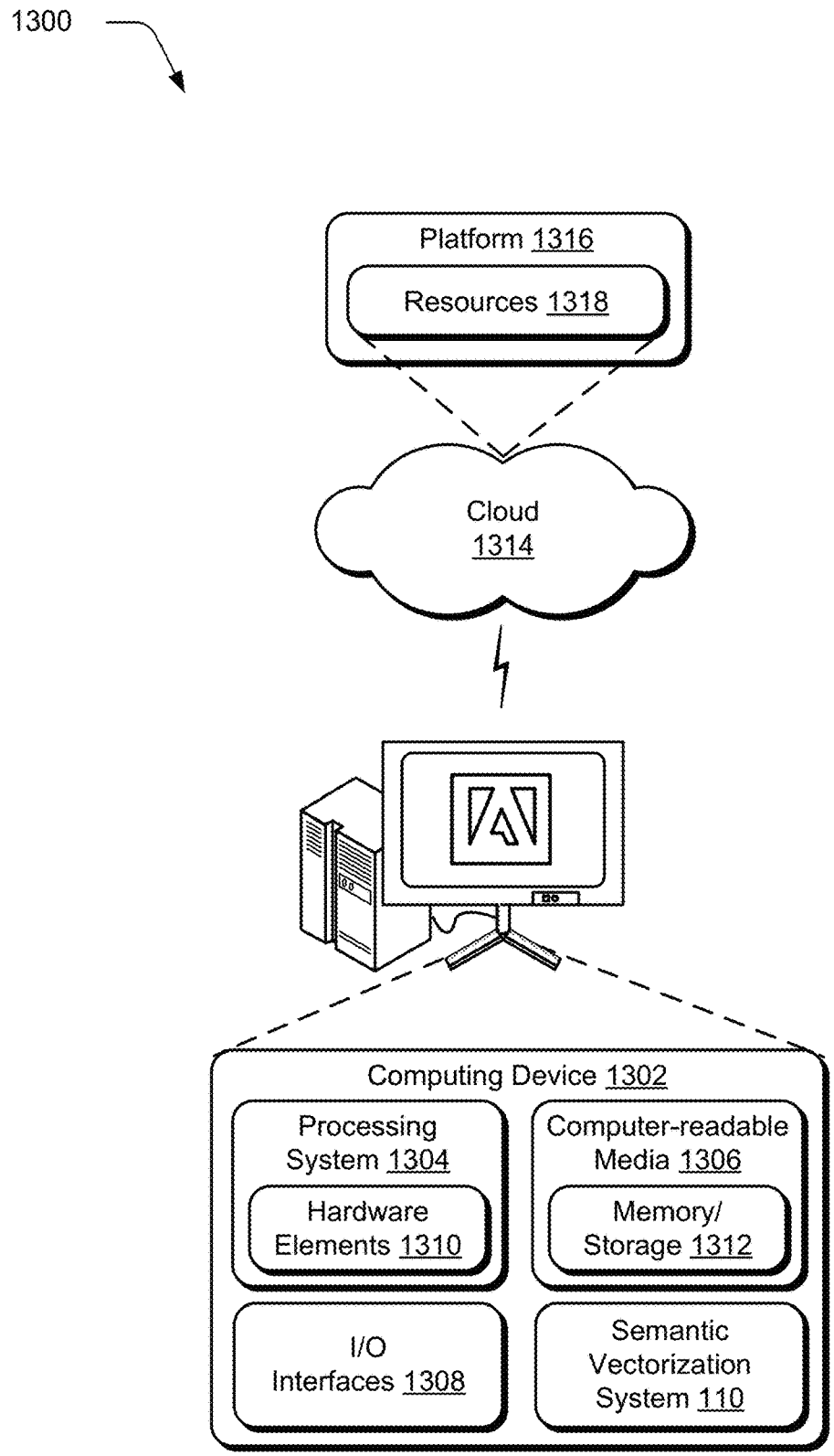
FIG. 13 illustrates an example system including various components of an example device that can be implemented as any type of computing device as described and/or utilize with reference to FIGS. 1-12 to implement embodiments of the techniques described herein.

FIG. 13 illustrates an example system generally at 1300 that includes an example computing device 1302 that is representative of one or more computing systems and/or devices that implement the various techniques described herein. This is illustrated through inclusion of the semantic vectorization system 110. The computing device 1302 is configurable, for example, as a server of a service provider, a device associated with a client (e.g., a client device), an on-chip system, and/or any other suitable computing device or computing system.

The example computing device 1302 as illustrated includes a processing system 1304, one or more computer-readable media 1306, and one or more I/O interface 1308 that are communicatively coupled, one to another. Although not shown, the computing device 1302 further includes a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1304 is representative of functionality to perform one or more operations using hardware. Accordingly, the processing system 1304 is illustrated as including hardware element 1310 that is configurable as processors, functional blocks, and so forth. This includes implementation in hardware as an application specific integrated circuit or other logic device formed using one or more semiconductors. The hardware elements 1310 are not limited by the materials from which they are formed or the processing mechanisms employed therein. For example, processors are configurable as semiconductor(s) and/or transistors (e.g., electronic integrated circuits (ICs)). In such a context, processor-executable instructions are electronically-executable instructions.

The computer-readable storage media 1306 is illustrated as including memory/storage 1312. The memory/storage 1312 represents memory/storage capacity associated with one or more computer-readable media. The memory/storage 1312 includes volatile media (such as random access memory (RAM)) and/or nonvolatile media (such as read only memory (ROM), Flash memory, optical disks, magnetic disks, and so forth). The memory/storage 1312 includes fixed media (e.g., RAM, ROM, a fixed hard drive, and so on) as well as removable media (e.g., Flash memory, a removable hard drive, an optical disc, and so forth). The computer-readable media 1306 is configurable in a variety of other ways as further described below.

Input/output interface(s) 1308 are representative of functionality to allow a user to enter commands and information to computing device 1302, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., employing visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1302 is configurable in a variety of ways as further described below to support user interaction.

Various techniques are described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques are configurable on a variety of commercial computing platforms having a variety of processors.

An implementation of the described modules and techniques is stored on or transmitted across some form of computer-readable media. The computer-readable media includes a variety of media that is accessed by the computing device 1302. By way of example, and not limitation, computer-readable media includes "computer-readable storage media" and "computer-readable signal media."

"Computer-readable storage media" refers to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable, and non-removable media and/or storage devices implemented in a method or technology suitable for storage of information such as computer readable instructions, data structures, program modules, logic elements/circuits, or other data. Examples of computer-readable storage media include but are not limited to RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and are accessible by a computer.

"Computer-readable signal media" refers to a signal-bearing medium that is configured to transmit instructions to the hardware of the computing device 1302, such as via a network. Signal media typically embodies computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1310 and computer-readable media 1306 are representative of modules, programmable device logic and/or fixed device logic implemented in a hardware form that are employed in some embodiments to implement at least some aspects of the techniques described herein, such as to perform one or more instructions. Hardware includes components of an integrated circuit or on-chip system, an application-specific integrated circuit (ASIC), a field-programmable gate array (FPGA), a complex programmable logic device (CPLD), and other implementations in silicon or other hardware. In this context, hardware operates as a processing device that performs program tasks defined by instructions and/or logic embodied by the hardware as well as a hardware utilized to store instructions for execution, e.g., the computer-readable storage media described previously.

Combinations of the foregoing are also be employed to implement various techniques described herein. Accordingly, software, hardware, or executable modules are implemented as one or more instructions and/or logic embodied on some form of computer-readable storage media and/or by one or more hardware elements 1310. The computing device 1302 is configured to implement particular instructions and/or functions corresponding to the software and/or hardware modules. Accordingly, implementation of a module that is executable by the computing device 1302 as software is achieved at least partially in hardware, e.g., through use of computer-readable storage media and/or hardware elements 1310 of the processing system 1304. The instructions and/or functions are executable/operable by one or more articles of manufacture (for example, one or more computing devices 1302 and/or processing systems 1304) to implement techniques, modules, and examples described herein.

The techniques described herein are supported by various configurations of the computing device 1302 and are not limited to the specific examples of the techniques described herein. This functionality is also implementable all or in part through use of a distributed system, such as over a "cloud" 1314 via a platform 1316 as described below.

The cloud 1314 includes and/or is representative of a platform 1316 for resources 1318. The platform 1316 abstracts underlying functionality of hardware (e.g., servers) and software resources of the cloud 1314. The resources 1318 include applications and/or data that can be utilized while computer processing is executed on servers that are remote from the computing device 1302. Resources 1318 can also include services provided over the Internet and/or through a subscriber network, such as a cellular or Wi-Fi network.

The platform 1316 abstracts resources and functions to connect the computing device 1302 with other computing devices. The platform 1316 also serves to abstract scaling of resources to provide a corresponding level of scale to encountered demand for the resources 1318 that are implemented via the platform 1316. Accordingly, in an interconnected device embodiment, implementation of functionality described herein is distributable throughout the system 1300. For example, the functionality is implementable in part on the computing device 1302 as well as via the platform 1316 that abstracts the functionality of the cloud 1314.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method implemented by a computing device, the method comprising:
   receiving, by the computing device, a digital image including a raster object having a plurality of pixels;
   assigning, by the computing device, semantic tags to individual pixels of the plurality of pixels of the raster object by parsing the digital image using semantic classification as implemented by a semantic classification model as part of machine learning;
   identifying, by the computing device, a semantic cluster of pixels from the plurality of pixels of the raster object based on the semantic tags based on a threshold area;
   determining, by the computing device, a path around the semantic cluster; and
   generating, by the computing device, a semantic vector object based on the path.

2. The method as described in claim 1, wherein the semantic cluster of pixels includes a single said semantic tag.

3. The method as described in claim 1, wherein the semantic classification model is trained as part of machine learning using training data including training raster objects and ground truth semantic classification data of the training raster objects.

4. The method as described in claim 1, wherein the path is configured as a plurality of Bézier curves.

5. The method as described in claim 1, wherein generating the semantic vector object includes comparing an area enclosed by the path to a threshold area.

6. The method as described in claim 5, wherein the threshold area is based on a semantic classification associated with a respective said semantic tag.

7. The method as described in claim 1, wherein the semantic vector object is editable via user inputs received via a user interface.

8. The method as described in claim 1, further comprising:
   identifying, by the computing device, a shading area based on the semantic vector object; and
   generating, by the computing device, a shading vector object based on the shading area.

9. A system comprising:
   a semantic parsing module implemented at least partially in hardware of at least one computing device to assign a plurality of semantic classes to individual pixels of a plurality of pixels of a raster object, respectively, using a semantic classification model that implements semantic classification as part of machine learning;
   a segmentation module implemented at least partially in the hardware of the at least one computing device to identify a cluster of the plurality of pixels assigned a respective said semantic class that are proximal to each other; and
   a vector object generation module implemented at least partially in the hardware of the at least one computing device to generate a vector object based on the cluster.

10. The system as described in claim 9, wherein the plurality of semantic classes describes a plurality of types of semantic objects, respectively.

11. The system as described in claim 9, wherein the semantic parsing model is trained as part of the machine learning using training raster objects and ground truth semantic parsing data of the training raster objects.

12. The system as described in claim 9, further comprising a path generation module implemented at least partially in the hardware of the at least one computing device to generate a path around the cluster.

13. The system as described in claim 12, wherein the path generation module is further configured to:
generate an initial path; and
generate a modified path from the initial path based on a path rule, wherein the modified path is the path.

14. A system comprising:
means for receiving a raster object having a plurality of pixels;
means for determining a plurality of semantic classes for individual pixels of the plurality of pixels, respectively, using semantic classification as implemented by a semantic classification model using machine learning;
means for generating a plurality of clusters of pixels from the plurality of pixels of the raster object based on the plurality of semantic classes;
means for generating a plurality of paths around the plurality of clusters; and
means for generating a plurality of vector objects based on the plurality of paths.

15. The system as described in claim 14, wherein semantic class determining means includes a model as part of machine learning.

16. The system as described in claim 14, wherein the semantic classes identify the plurality of pixels as part of a plurality of semantic objects.

17. The system as described in claim 16, wherein the plurality of semantic objects include at least part of at least one of a human, an article of clothing, a car, a road, and a background.

18. The system as described in claim 14, further comprising:
means for identifying a first group of pixels and a second group of pixels having a respective semantic class, the first group of pixels distinct from the second group of pixels; and
means for determining a proximity of the first group of pixels to the second group of pixels, wherein means for generating the plurality of clusters comprise means for generating a cluster of pixels of the plurality of clusters to comprise the first group of pixels and the second group of pixels based on the proximity.

19. The system as described in claim 15, wherein the plurality of clusters includes a plurality of respective clusters having a respective semantic class.

20. The system as described in claim 15, further comprising identifying a set of vector objects from the plurality of vector objects based on the semantic classes.

* * * * *